(12) United States Patent
Wickline

(10) Patent No.: US 6,430,815 B1
(45) Date of Patent: Aug. 13, 2002

(54) PIPE CUTTING DEVICE

(76) Inventor: Gregory R. Wickline, 33 Peckham St., Rochester, NY (US) 14621

( * ) Notice: Subject to any disclaimer, the term of this patent is extended or adjusted under 35 U.S.C. 154(b) by 0 days.

(21) Appl. No.: 09/871,784

(22) Filed: Jun. 1, 2001

(51) Int. Cl.⁷ .............................................. B23D 21/06
(52) U.S. Cl. ............................................ 30/101; 30/96
(58) Field of Search ............................ 30/92, 93, 94, 30/95, 96, 98, 99, 101, 102

(56) References Cited

U.S. PATENT DOCUMENTS

| | | | |
|---|---|---|---|
| 2,782,500 A | | 2/1957 | Kelley |
| 2,937,440 A | * | 5/1960 | Kelly ............................ 30/95 |
| 3,290,779 A | | 12/1966 | Bridges et al. |
| 4,078,304 A | * | 3/1978 | Netzel ......................... 30/101 |
| 4,177,557 A | | 12/1979 | Courty |
| 4,224,737 A | | 9/1980 | Hart |
| 4,305,205 A | | 12/1981 | Girala |
| 4,438,562 A | | 3/1984 | Courty |
| D329,793 S | | 9/1992 | Fukuda |
| 5,414,932 A | * | 5/1995 | Azkona ......................... 30/96 |

* cited by examiner

Primary Examiner—Hwei-Slu Payer

(57) ABSTRACT

A pipe cutting device for cutting copper pipes, in particular, to length. The pipe cutting device includes a handle member; and also includes a cutter support assembly being attached to the handle member; and further includes a cutting member being rotatably mounted to the cutter support assembly; and also includes rollers being disposed in the cutter support assembly for facilitating rotation of a pipe being cut; and further includes an adjustable closure assembly being attached to the cutter support assembly.

8 Claims, 1 Drawing Sheet

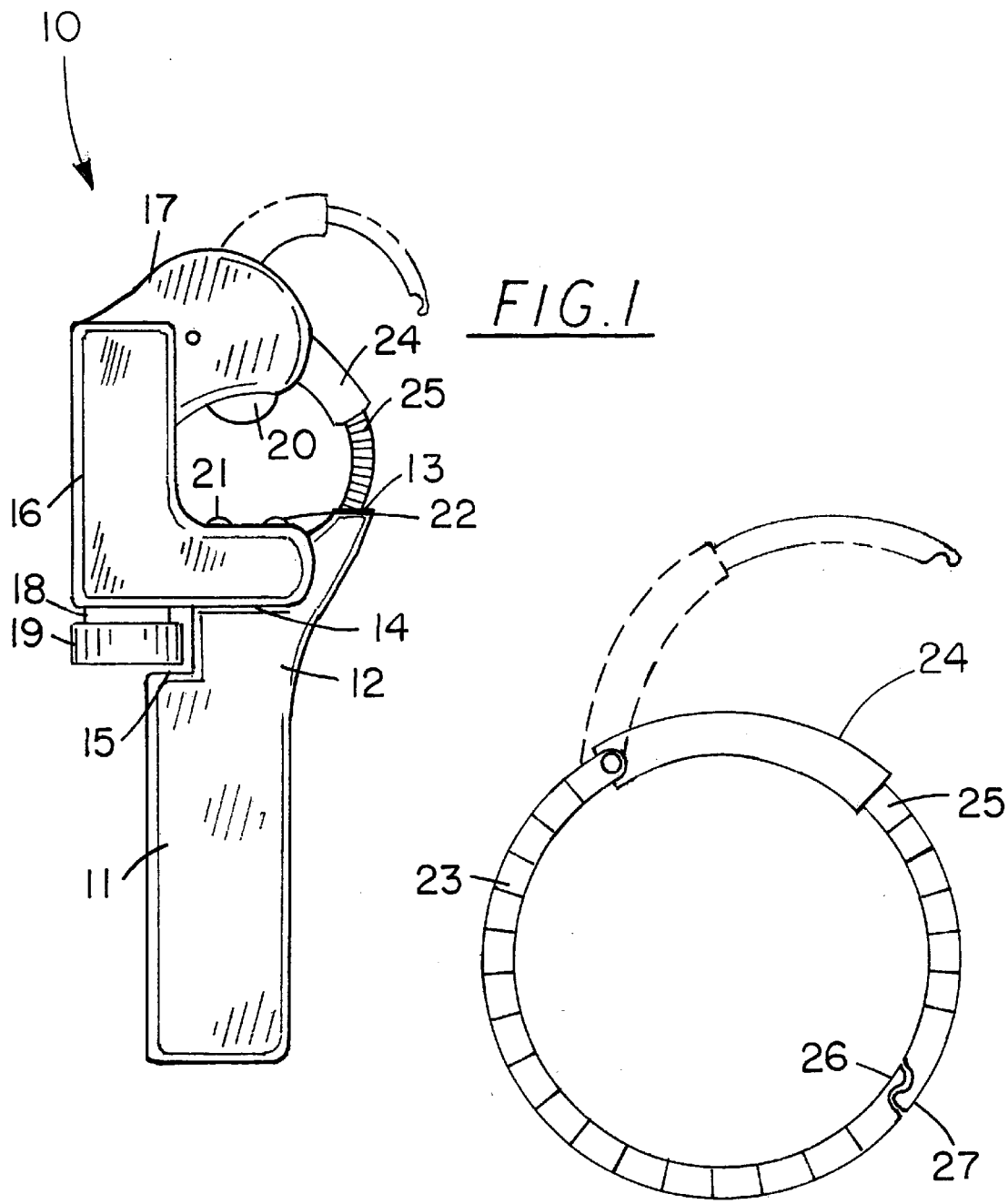

PIPE CUTTING DEVICE

BACKGROUND OF THE INVENTION
1. Field of the Invention

The present invention relates to pipe cutters and more particularly pertains to a new pipe cutting device for cutting copper pipes, in particular, to length.

2. Description of the Prior Art

The use of pipe cutters is known in the prior art. More specifically, pipe cutters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,290,779; U.S. Pat. No. 2,782,500; U.S. Pat. No. 4,305,205; U.S. Pat. No. 4,224,737; U.S. Pat. No. 4,438,562; and U.S. Pat. No. Des. 329,793.

While these devices fulfill their respective, particular objectives and requirements, the aforementioned patents do not disclose a new pipe cutting device. The inventive device includes a handle member; and also includes a cutter support assembly being attached to the handle member; and further includes a cutting member being rotatably mounted to the cutter support assembly; and also includes rollers being disposed in the cutter support assembly for facilitating rotation of a pipe being cut; and further includes an adjustable closure assembly being attached to the cutter support assembly.

In these respects, the pipe cutting device according to the present invention substantially departs from the conventional concepts and designs of the prior art, and in so doing provides an apparatus primarily developed for the purpose of cutting copper pipes, in particular, to length.

SUMMARY OF THE INVENTION

In view of the foregoing disadvantages inherent in the known types of pipe cutters now present in the prior art, the present invention provides a new pipe cutting device construction wherein the same can be utilized for cutting copper pipes, in particular, to length.

The general purpose of the present invention, which will be described subsequently in greater detail, is to provide a new pipe cutting device which has many of the advantages of the pipe cutters mentioned heretofore and many novel features that result in a new pipe cutting device which is not anticipated, rendered obvious, suggested, or even implied by any of the prior art pipe cutters, either alone or in any combination thereof.

To attain this, the present invention generally comprises a handle member; and also includes a cutter support assembly being attached to the handle member; and further includes a cutting member being rotatably mounted to the cutter support assembly; and also includes rollers being disposed in the cutter support assembly for facilitating rotation of a pipe being cut; and further includes an adjustable closure assembly being attached to the cutter support assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pipe cutting device which has many of the advantages of the pipe cutters mentioned heretofore and many novel features that result in a new pipe cutting device which is not anticipated, rendered obvious, suggested, or even implied by any of the prior art pipe cutters, either alone or in any combination thereof.

It is another object of the present invention to provide a new pipe cutting device which may be easily and efficiently manufactured and marketed.

It is a further object of the present invention to provide a new pipe cutting device which is of a durable and reliable construction.

An even further object of the present invention is to provide a new pipe cutting device which is susceptible of a low cost of manufacture with regard to both materials and labor, and which accordingly is then susceptible of low prices of sale to the consuming public, thereby making such pipe cutting device economically available to the buying public.

Still yet another object of the present invention is to provide a new pipe cutting device which provides in the apparatuses and methods of the prior art some of the advantages thereof, while simultaneously overcoming some of the disadvantages normally associated therewith.

Still another object of the present invention is to provide a new pipe cutting device for cutting copper pipes, in particular, to length.

Yet another object of the present invention is to provide a new pipe cutting device which includes a handle member; and also includes a cutter support assembly being attached to the handle member; and further includes a cutting member being rotatably mounted to the cutter support assembly; and also includes rollers being disposed in the cutter support assembly for facilitating rotation of a pipe being cut; and further includes an adjustable closure assembly being attached to the cutter support assembly.

Still yet another object of the present invention is to provide a new pipe cutting device that is easy and convenient to use.

Even still another object of the present invention is to provide a new pipe cutting device that allows the user to cut pipes more efficiently and quickly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a new pipe cutting device according to the present invention.

FIG. 2 is a detailed side elevational view of the ratcheting fastener mechanism of the present invention.

DESCRIPTION OF THE PREFERRED EMBODIMENT

With reference now to the drawings, and in particular to FIGS. 1 through 2 thereof, a new pipe cutting device embodying the principles and concepts of the present invention and generally designated by the reference numeral 10 will be described.

As best illustrated in FIGS. 1 through 2, the pipe cutting device 10 generally comprises a handle member 11 including an upper portion 12 having a bore 13 disposed therein and also having stepped recessed portions 14,15 being disposed in a top thereof. An adjustable cutter support assembly is conventionally attached to the handle member 11. The adjustable cutter support assembly includes a base housing member 16 being securely and conventionally attached upon one of the stepped recessed portions 14,15, and also includes a shroud member 17 being pivotally attached to a top end of the base housing member 16, and further includes a cutter support member 18 being adjustably disposed in the base housing member 16, and also includes a cutter adjustment member 19 being connected and threaded to the cutter support member 18 with the base housing member 16 being L-shaped.

A cutting member 20 is rotatably and conventionally mounted to the cutter support assembly. The cutting member 20 is a disc having a blade portion extending along a circumference thereof, and is also partially disposed in the shroud member 17 and is further rotatably and conventionally attached to the cutter support member 18. Rollers 21,22 are conventionally disposed in the cutter support assembly for facilitating rotation of a pipe being cut. The rollers 21,22 are spaced apart and are disposed in an exterior of the base housing member 16 and are also diametrically-opposed to the cutting member 20.

An adjustable closure assembly is conventionally attached to the cutter support assembly. The adjustable closure assembly includes an arcuate closure support member 23 being disposed in the base housing member 16 and in the bore 13 of the upper portion 12 of the handle member 11, and also includes an arcuate tubular catch member 24 being pivotally and conventionally attached to the arcuate closure support member 23, and further includes an arcuate ratcheted arm member 25 being engagably received in the arcuate tubular catch member 24 and being fastenable to an end of the arcuate closure support member 23. The arcuate ratcheted arm member 25 includes a hooked end portion 27, and the arcuate closure support member includes a hooked end portion 26 which fastens to and mates with the hooked end portion 27 of the arcuate ratcheted arm member 25 to securely close the arcuate ratchet arm member 25 about a pipe being disposed between the cutting member 20 and the rollers 21,22.

In use, the user pivots the arcuate ratcheted arm member 25 to open the side of the pipe cutting device 10 and to allow the user to place a pipe between the cutting member 20 and the rollers 21,22; whereupon, the user secures the arcuate ratcheted arm member 25 over the open side of the pipe cutting device 10 to secure and hold the pipe between the cutting member 20 and the rollers 21,22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipe cutting device comprising:

a handle member, said handle member including an upper portion having a bore disposed therein and also having stepped recessed portions disposed in a top thereof;

an adjustable cutter support assembly being attached to said handle member, said adjustable cutter support assembly including a base housing member being securely attached upon one of said stepped recessed portions, and also) including a shroud member being pivotally attached to a top end of said base housing member, and further including a cutter support member being adjustably disposed in said base housing member, and also including a cutter adjustment member being connected to said cutter support member, said base housing member being L-shaped;

a cutting member being rotatably mounted to said cutter support assembly, said cutting member being a disc having a blade portion extending along a circumference thereof, and being also partially disposed in and being rotatably attached to said shroud member of said adjustable cutter support assembly;

rollers being disposed in said cutter support assembly for facilitating rotation of a pipe being cut, said rollers being spaced apart and being disposed in an exterior of said base housing member and being also diametrically opposed to said cutting member; and an adjustable closure assembly being attached to said cutter support assembly, said adjustable closure assembly including an arcuate closure support member being disposed in said base housing member and in said bore of said upper portion of said handle member, and also including an arcuate tubular catch member being pivotally attached to said arcuate closure support member, and further including an arcuate ratcheted arm member being engagably received in said arcuate tubular catch member and being fastenable to an end of said arcuate closure support member, said arcuate ratcheted arm member including a hooked end portion, and said arcuate closure support member including a hooked end portion which fastens to and mates with said hooked end portion of said arcuate ratcheted arm member to securely close said arcuate ratcheted arm member about a pipe being disposed between said cutting member and said rollers.

2. A pipe cutting device comprising:

a handle member;

a cutter support assembly being attached to said handle member;

a cutting member being rotatably mounted to said cutter support assembly;

rollers being disposed in said cutter support assembly for facilitating rotation of a pipe being cut;

an adjustable closure assembly being attached to said cuter support assembly; and wherein said handle member includes an upper portion having a bore disposed therein and also having stepped recessed portions disposed in a top thereof.

3. A pipe cutting device as described in claim 1, wherein said cutter support assembly includes a base housing member being securely attached upon one of said stepped recessed portions, and also includes a shroud member being pivotally attached to a tool end of said base housing member, and further includes a cutter support member being adjustably disposed in said base housing member, and also includes a cutter adjustment member being connected to said cutter support member.

4. A pipe cutting device as described in claim 3, wherein said base housing member is L-shaped.

5. A pipe cutting device as described in claim 3, wherein. said cutting member is a disc having a blade portion extending along a circumference thereof, and is also partially disposed in and being rotatably attached to said shroud member of said cutter support assembly.

6. A pipe cutting device as described in claim 3, wherein said rollers are spaced apart and are disposed in an exterior of said base housing member and are also diametrically-opposed to said cutting member.

7. A pipe cutting device as described in claim 3, wherein said adjustable closure assembly includes an arcuate closure support member being disposed in said base housing member and in said bore of said upper portion of said handle member, and also includes an arcuate tubular catch member being pivotally attached to said arcuate closure support member, and further includes an arcuate ratcheted arm member being engagably received in said arcuate tubular catch member and being fastenable to an end of said arcuate closure support member.

8. A pipe cutting device as described in claim 7, wherein said arcuate ratcheted arm member includes a hooked end portion, and said arcuate closure support member includes a hooked end portion which fastens to and mates with said hooked end portion of said arcuate ratcheted arm member to securely close said arcuate ratcheted arm member about a pipe being disposed between said cutting member and said rollers.

* * * * *